Feb. 27, 1923.

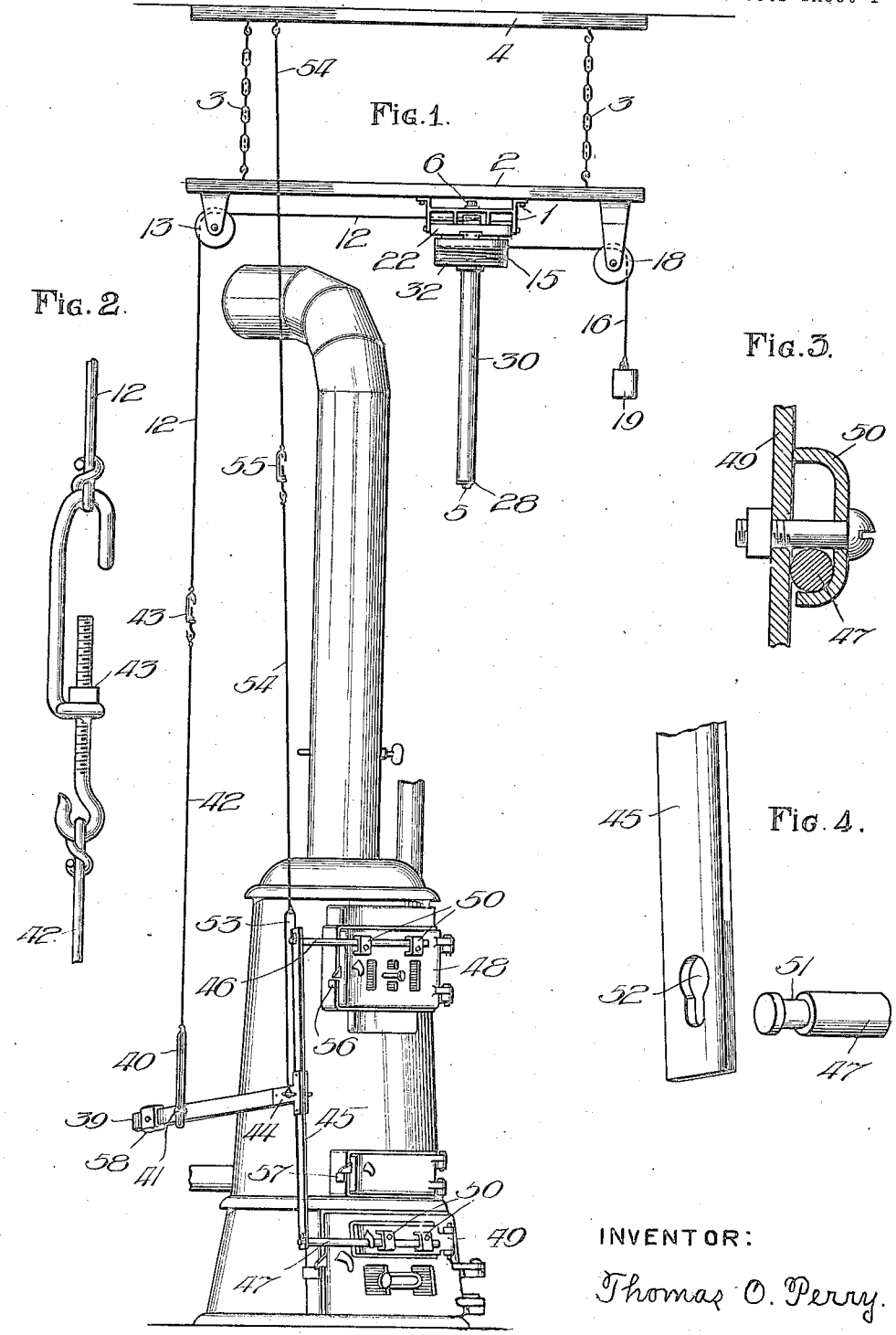

T. O. PERRY

DAMPER REGULATOR

Filed Oct. 17, 1919

1,446,481

3 sheets-sheet 2

INVENTOR:

Thomas O. Perry.

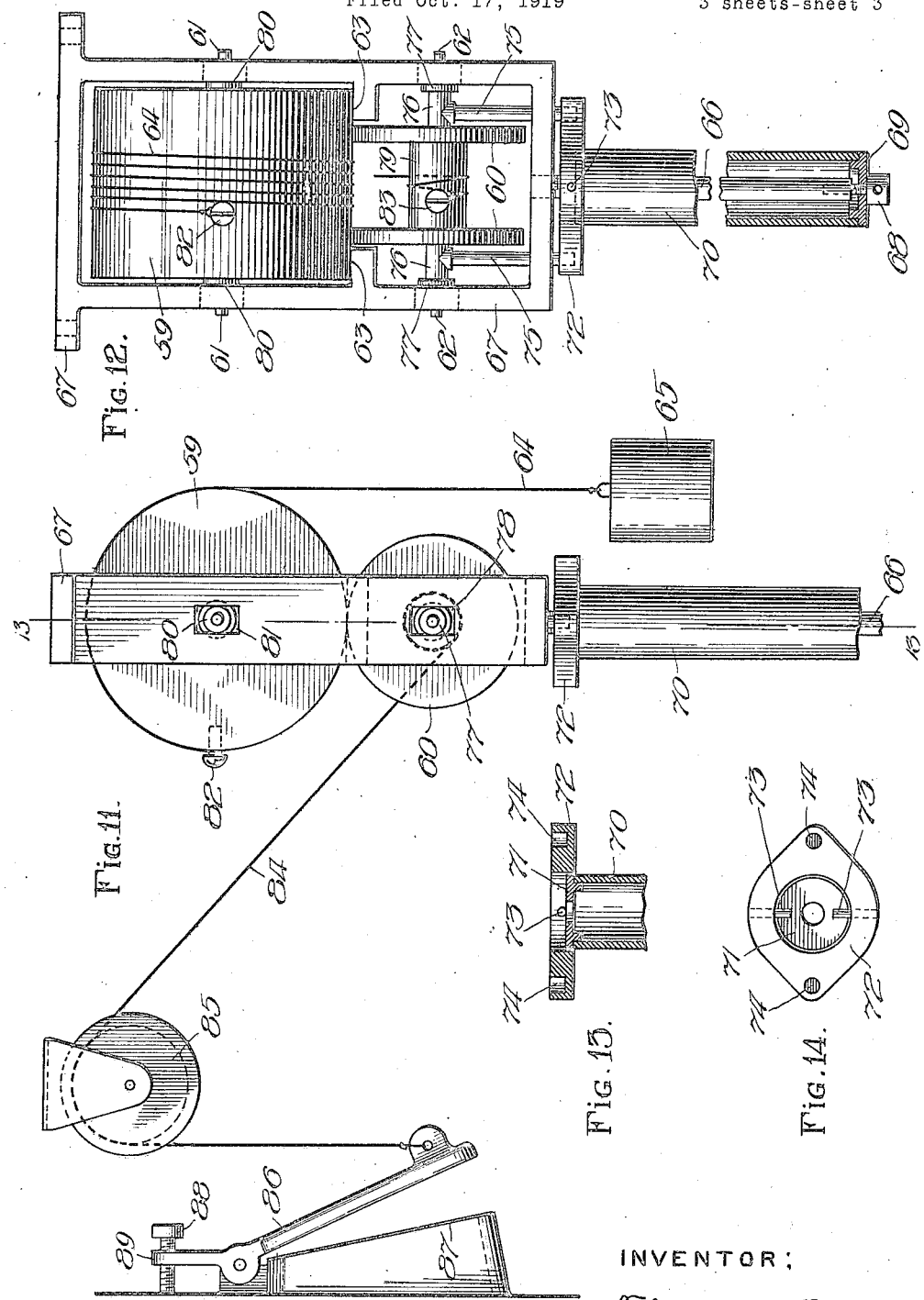

Patented Feb. 27, 1923.

1,446,481

UNITED STATES PATENT OFFICE.

THOMAS O. PERRY, OF OAK PARK, ILLINOIS.

DAMPER REGULATOR.

Application filed October 17, 1919. Serial No. 331,501.

*To all whom it may concern:*

Be it known that I, THOMAS O. PERRY, a citizen of the United States, residing at Oak Park, in the county of Cook and State of Illinois (whose post-office address is 324 North Euclid Ave., Oak Park, Illinois), have invented a new and useful Damper Regulator, of which the following is a specification.

My invention relates to improvements in damper regulators in which the damper mechanism of a heater is indirectly operated by a motor whose intermittent actions are initiated and controlled by the expansions and contractions of a thermal couple; and the objects of my improvements are, first, to provide simple and effective mechanism for initiating and arresting the occasional actions of the motor, by very slight expansive and contractive changes in the thermal couple caused by small variations of temperature, so as to effect partial or complete damper movements as conditions require; and second to provide for convenient and inexpensive installation.

I attain these objects by the mechanism illustrated in the accompanying drawings, in which—

Figures 5, 6:
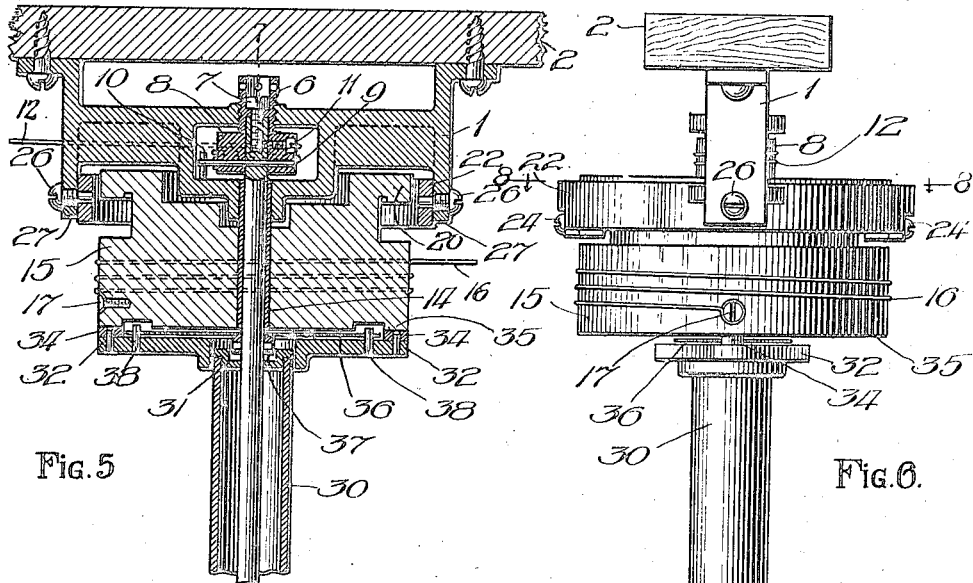
Figure 7:
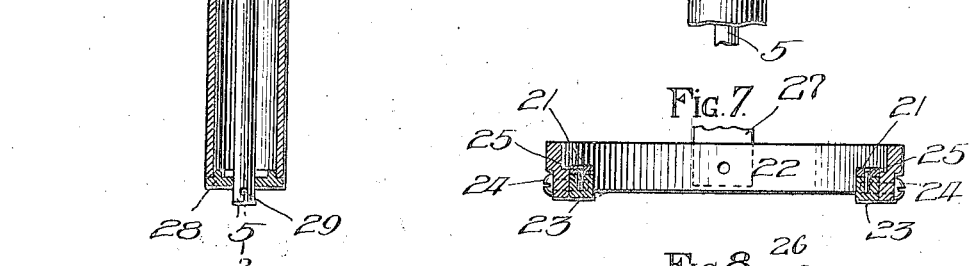
Figure 9:
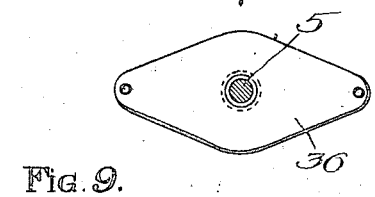
Figure 10:
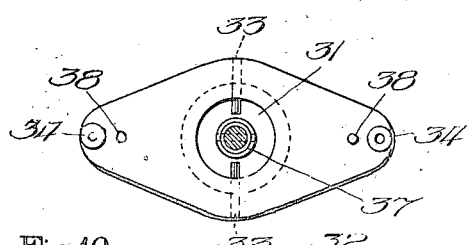
Figure 8:
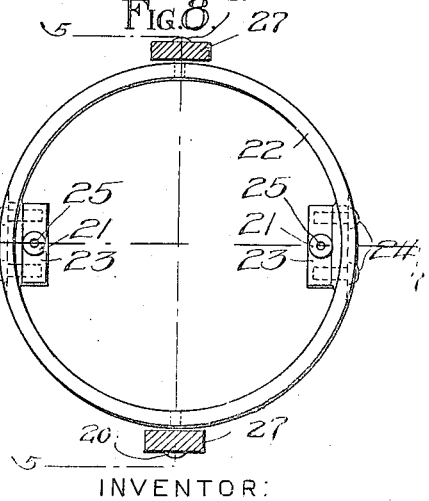

Figure 1 shows in elevation a complete installation of the damper regulator in connection with a small hot water heater of the usual variety burning coal; Fig. 2 is an enlarged view of the adjustable cord connection; Fig. 3 shows an enlargement of one of the damper rod clamps; Fig. 4 is an enlarged view at the lower end of the damper bar showing how the damper rod connects detachably therewith; Fig. 5 is an enlarged sectional front view of the thermal couple and parts immediately connected therewith taken at 5—5 on Fig. 6; Fig. 6 is an enlarged exterior side view of the parts shown in Fig. 5; Fig. 7 is an enlarged sectional elevation of the non-rotative support 21—22 taken in the plane indicated by the broken line 7—7 on Fig. 5; Fig. 8 is an enlarged plan of the non-rotative support ring 22 and buttons 21 showing also in section the depending spurs 27 taken at 8—8 on Fig. 6; Fig. 9 is an enlarged plan of the flexible actuating plate 36 projected from Fig. 5; Fig. 10 is an enlarged plan of the passive rotatable element 32 projected from Fig. 5; Fig. 11 is a side view showing a modified form of the damper regulator and attachments; Fig. 12 is a front view of the modified form of regulator corresponding to the parts shown in Fig. 11; Fig. 13 is a partial sectional elevation showing the upper end of the thermal tube and immediate connections taken in the plane of the dotted line 13—13 on Fig. 11; and Fig. 14 is a plan of the parts shown in Fig. 13.

Similar numerals refer to similar parts throughout the several views.

The casting 1 as illustrated in Fig. 1, is fastened by screws to the under side of a board or bar 2 which is suspended by chains 3 from the ceiling of a room containing the source of heat. A board 4 may be secured to the ceiling from which to hang the chains. Casting 1 supports a thermal rod 5 which hangs from an adjustable bearing 6 screwed into the upper side of the casting. The upper end of the thermal rod terminates in a hanger screw 7 whose head rests and turns upon an interior shoulder of the adjustable bearing. Just beneath the adjusting bearing a damper spool 8 is secured to the thermal rod by means of the stop pin 9 one end of which projects beyond the spool and is adapted to engage the shoulder pin 10 set in the casting, to limit the rotational movement of the damper spool. The set screw 11 serves to prevent the hanger screw from turning in the thermal rod. One end of the damper cord 12 is caught on to the stop pin, wound around the damper spool once or twice and from thence led over a damper sheave 13 attached to the bar 2, down to connection with the damper mechanism. Beneath the damper spool, a bearing tube 14 is fixed at its upper end into the under side of the casting and extends downward to form a bearing for the active rotative element 15 which has a cylindrical exterior surface around which the motor cord 16 is wound several times and fastened at one end by means of the hitching screw 17. The motor cord is led over the motor sheave 18 attached to the bar 2 and sustains the motor weight 19. Normally, the active rotative element 15 is sustained by a non-rotative support 21—22, attached to the casting 1, through its upper peripheral shoulder 20 making frictional contact which resists rotation. Instead of making the non-rotative support in the form of a ring bearing all around its circumference, it is preferred to make the immediate support consist of two narrow frictional buttons 21 oppositely attached to the supporting ring 22 by means of the button holders 23 which are secured to the ring by means of the screws 24. The frictional buttons may be made in the form of discs perforated at the center to receive retaining pins 25 driven into the button holders. The supporting ring is preferably supported pivotally at two opposite points midway between the frictional buttons by means of the pivot screws 26 which screw tightly through depending spurs 27 of the casting and have reduced ends which enter pivot holes in the supporting ring.

The bearing tube 14 also constitutes a lower bearing for the thermal rod which extends downward some considerable distance and carries at its free lower end a supporting cap 28 which rests upon a retaining pin 29 piercing the end of the rod. The thermal tube 30, inclosing the thermal rod, rests upon the supporting cap at its lower end and has at its upper end a thrust cap 31 which is free to slide on the thermal rod when the tube expands or contracts. The passive rotative element 32 has a central opening, large enough to receive loosely the thrust cap, and two opposite thrust pins 33 whose inner ends project into the central opening so as to bear upon the periphery of the thrust cap. This passive rotative element extends some distance to either side of the axis of the thrust pins and carries at its extremities balanced push buttons 34 which are disposed to make more or less intimate contact with the lower circular peripheral shoulder 35 of the active rotative element, as the thermal tube expands or contracts with changes in temperature. These push buttons are similar to the frictional buttons 21 and are retained in the same way by central pins. A flexible actuating plate 36 made of thin sheet metal is secured to a cylindrical hub 37 which in turn is pinned on the thermal rod so as to partake of the rod's rotative motion. On either side of the thermal rod, some distance away, the flexible ends of the plate are pierced loosely by actuating pins 38 which are driven into the passive rotative element, just inside of the push buttons. The flexibility of this actuating plate greatly reduces frictional resistance to longitudinal thermostatic displacement of the passive element while subjected also to rotative tension.

The damper cord 12, as shown in Fig. 1, connects with the damper lever 39 by means of a stiff wire loop 40 which can slip vertically on the headed button 41 projecting from the side of the lever. The loop is formed on the lower end of a wire 42 which extends up to meet the damper cord, from which it hangs by means of an adjustable screw connection 43, shown enlarged in Fig. 2. A T splice 44 joins the damper lever 39 with the damper bar 45 at about right angles thereto. The damper rods 46 and 47, which are clamped to the doors 48 and 49 by means of clamps 50, extend laterally to meet and pierce loosely the upper and lower extremities of the damper bar. A circular notch 51 at the end of the damper rod is readily hooked into or released from the keyhole shaped perforation 52 formed in either end of the damper bar, as illustrated in the enlarged Fig. 4. The upper door 48, in this case, is the feed door for fuel and the lower door 49 is the draft door for supplying air beneath the grate. A long clevis 53 straddles and connects pivotally with the T splice 44 and is drawn upward and rearward by a ceiling wire 54 which includes an adjustable screw connection 55. The ceiling wire is shortened sufficiently to lift both doors clear of the catches 56 and 57, and the weight of the doors being partially supported by the inclined ceiling wire, both are normally held closed without being latched. But the weight of the damper lever 39, aided, if need be, by the sliding weight 58, tends to open the draft door whenever the tension of the damper cord is relaxed. When the draft door is opened by the weighted lever, the damper bar fulcrums on the upper damper rod. When the damper lever is lifted by the damper cord, the draft door must first close before the feed door will open. After the draft door closes, further lifting of the damper lever opens the feed door, the lower damper rod then acting as a fulcrum. In the reverse action, the feed door must close before the draft door will open. This damper mechanism is very similar to that shown in my application No. 260,542, filed Oct. 31, 1918, for heat regulator.

The operation of the regulator is as follows: The thermal tube 30 and the thermal rod 5 form a thermal couple whose unequal expansion and contraction due to changes in temperature initiates the action of a motive force adapted to overcome the natural resistance to displacement of the damper mechanism and in turn releases the damper mechanism to resume its initial position.

The active rotative element 15 is constantly impelled to rotation in one direction by the tension of the motor cord 16 which sustains the motive weight, but is normally more or less restrained from rotation by frictional contact with the non-rotative frictional buttons 21, the friction at its maximum being sufficient to prevent rotation. The passive rotative element 32 is normally inactive and allows the damper mechanism to take, of its own accord, the position it naturally assumes, through gravitational action or otherwise; but when expansion of the thermal tube 30 thrusts the push buttons 34 against the peripheral surface 35 of the active rotative element 15, the frictional contact with the fixed non-rotative frictional buttons 21 is relieved, allowing the active element to revolve with more or less freedom and carry with it the rotative passive element. To whatever extent the active element's frictional contact with the non-rotative frictional buttons is decreased by the thermostatic expansion, its frictional contact with the push buttons on the passive element is increased. The transference of pressure from the non-rotative buttons to the rotative push buttons may allow the superior motive force to overcome the inferior natural resistance of the damper mechanism until the rotation of both the passive and active elements is arrested either by contact between the stop-pin 9 and shoulder pin 10 or by increasing resistance to damper movement. Contraction of the thermal tube first allows the active element to resume or increase its pressure against the non-rotative buttons and, by continuance, may release contact with the push buttons until the passive element is free to reverse its motor given action through the reactive force of the damper mechanism. The motive force applied to the motor cord must not exceed the frictional resistance to rotation which may be offered by the non-rotative and rotative buttons 21 and 34 respectively, whether the resistance is due to only one pair of buttons or to both pairs combined.

The motive force applied to the motor cord should be considerably in excess of absolute requirement so that actual loss of contact between the active rotative element and either pair of frictional buttons 21 and 34 need not occur, and only a variation of pressure will suffice. The variation of pressure required is effected by a very slight expansion and contraction of the thermal tube which is preferably made of ebonite, a material several times more sensitive to variations in temperature than the steel thermal rod. Moreover, the thermal rod, being inclosed within the thermal tube, is well protected from the influence of temperature changes in the external air.

The extreme sensitiveness of the apparatus renders it feasible to locate the regulator anywhere that the temperature of the air is affected by the heater controlled, or to be employed for operating a ventilator in a room whose temperature is changed only by admission or exclusion of air not artificially affected by a heater; but from the view point of most effectively controlling and economizing fuel consumption, the best location is in the immediate neighborhood of the heater where the changes of temperature are more quickly experienced, in part by direct radiation, as shown in Fig. 1.

The motor weight 19 must be wound up occasionally, but if the winding is attended to every time the fire needs attention, the weight will never be found greatly run down, and its position will show exactly how much it has had to operate. The knowledge thus acquired is a very valuable guide for making changes in adjustment of whatever nature, when needed.

For winding up the motive weight, the active element 15 or 59 is grasped and turned by hand. No special provision, such as a crank, is required, as resistance to rotation of the active element is friction only, sufficient to enable it to normally hold the weight. The weight can descend only when released by expansion of the thermal tube, and remains stationary when the thermal tube contracts and permits reverse movement of the dampers. The weight can descend at one time only so far as the limitation of damper movement allows and, as a rule, moves only enough to check the rise in temperature. It may descend a maximum distance of several inches, but more often descends only a small fraction of its possible movement at any one time before a reverse occurs. In practice, one winding of the motive weight up from floor to ceiling suffices usually for more than ten days of constant use.

A motor weight of not more than one pound is sufficient for operating the damper mechanism of any ordinary heater. The motor cord winds around a cylindrical surface having several times the diameter of the damper spool, giving the motor an advantage in leverage which enables it to overcome a resistance to damper movement much in excess of its own direct tension. Moreover the damper mechanism can be counterweighted to operate easily in either direction against small resistance, and this resistance may be made to increase or diminish with the progressive movement, so that the change of damper movement may occur gradually or abruptly as desired.

The terms "motor", "motor weight" and "motive force" all express the force applied to constantly urge rotation of the active element in one direction. As shown, the motor is represented by a weight, though it might be a spring under tension and might involve a train of gears, as in a clock. Or, the constant rotative tendency of the active rotative element might be due to other kinds of motive force, such as a water wheel, or most any kind of motor whose propulsive action could be restrained within required limits.

The damper mechanism shown in Fig. 1 offers increasing resistance to increase of movement, while checking the fire both before and after the draft door closes, because of the change in inclination of the ceiling wire 54. If the closing of the draft door suffices to arrest further rise in temperature, the feed door will not open, but will open, if required, by a slightly further increase in temperature. In the reverse movement the feed door closes gradually and is liable to stop in any intermediate position whenever such closing movement suffices to stop the lowering of temperature. Otherwise the feed door closes, and a still further reduction of temperature, if it occurs, will open the draft door. This is the action according to observation in actual use.

Figures 11, 12, 13 and 14 show a modified form of the damper regulator in which the active rotative element 59 and the passive rotative element 60 both have horizontal axes 61 and 62. The action is the same as in the previous case except that here it is the cylindrical surfaces of the two rotative elements which make contact with each other instead of flat contact surfaces. The non-rotative supports 63 against which the cylindrical surface of the active element rests are represented as if flat. A motor sheave is not necessary in this case since the motor cord 64, as it unwinds from the cylindrical surface of the active element, suspends the motive weight 65 without change of direction.

The thermal rod 66 is screwed securely into the lower end of the casting 67 which is supposed to be supported from the ceiling of the room containing the source of heat to be regulated, or in any convenient manner. An adjusting screw 68 with a cylindrical head screws into the lower end of the thermal rod 66 and supports on its head the supporting cap 69 on which rests the thermal tube 70 whose upper end terminates in the thrust cap 71. A thrust plate 72 with a central opening large enough to receive loosely the thrust cap has two thrust pins 73 whose inner ends bear against the thrust cap on opposite sides, as shown in Figs. 13 and 14. At opposite ends of the thrust plate are sockets 74 adapted to receive loosely the lower ends of two thrust rods 75 which pass through the lower part of the casting 67 and sustain at their upper ends two thrust bearings 76 for the axle 62 of the passive rotative element. The ends of the axle 62 have flanged roller bearings 77 which are free to move vertically in rectangular guide slots 78 cut in the sides of the casting. The passive thermal element consists of two rotative discs 60 rigidly united by an intermediate damper spool 79 having a common axis with the discs. The active rotative element 59 normally rests upon the non-rotative supports 63 from which its pressure may be more or less relieved by expansion of the thermal tube, and the ends of its axle 61 have flanged roller bearings 80 which are free to move vertically in the rectangular guides 81 cut in the sides of the casting. The hitching screw 82 holds one end of the motor cord 64 which winds several times around the cylindrical periphery of the active rotative element 59 and sustains the motive weight 65 at its other end.

The screw 83 holds one end of the damper cord 84 which winds once or twice around the damper spool 79 and is led over the damper sheave 85 down to the hinged damper 86 whose weight is partially sustained by the damper cord. The damper seat 87 incloses an opening which may communicate either with the flue of a heater, or with the ash pit, or with the open air. An adjustable stop 88, screwed through an arm 89 integral with the damper, serves to limit the damper movement, and incidentally limits the operative movement of the motive weight.

I claim:

1. The combination with damper mechanism and a bodily displaceable active element which is also rotative for actuating said damper mechanism in one direction, of a rotatable passive element capable of rotation in one direction by frictional contact with said active element and revolvable in the reverse direction by said damper mechanism connected therewith, non-rotative support for said active element limiting bodily displacement in one direction while offering frictional resistance to rotation and a thermal couple whose expansions and contractions due to changes in temperature produce variations in pressure between said active and passive elements and also between said active element and said non-rotative support, substantially as herein set forth.

2. The combination with damper mechanism and a bodily displaceable active element which is also rotative for actuating said damper mechanism in one direction, of a rotatable passive element capable of rotation in one direction by frictional contact with said active element and revolvable in the reverse direction by said damper mechanism connected therewith, non-rotative support for said active element limiting bodily displacement in one direction while offering frictional resistance to rotation, a motor tending to rotate said active element constantly in one direction and a thermal couple whose expansions and contractions due to changes in temperature produce variations in pressure between said active and passive elements as well as between said active element and said non-rotative support, substantially as herein set forth.

3. The combination with damper mechanism and a bodily displaceable active element which is also rotative for actuating said damper mechanism in one direction, of a rotatable passive element capable of rotation in one direction by frictional contact with said active element and revolvable in the reverse direction by said damper mechanism connected therewith, non-rotative support for said active element offering frictional resistance to rotation by opposing bodily displacement in one direction, a motor tending to actuate said active element constantly in one direction and a thermal couple whose expansions and contractions due to changes in temperature produce variations in pressure between said active and passive elements as well as between said non-rotative support and said active element, substantially as herein set forth.

4. The combination with damper mechanism, a bodily displaceable active element which is also rotative for actuating said damper mechanism in one direction and a motive weight tending constantly to rotate said active element, of a rotatable passive element capable of rotation in one direction by frictional contact with said active element and revolvable in the reverse direction by said damper mechanism connected therewith, non-rotative support for said active element offering frictional resistance to rotation by opposing bodily displacement in one direction and a thermal couple whose expansions and contractions due to changes in temperature produce variations in pressure between said active and passive elements and between said active element and said non-rotative support, substantially as herein set forth.

5. The combination with damper mechanism, a bodily displaceable active element which is also rotative for actuating said damper mechanism in one direction contrary to gravitational resistance and a motor giving constant rotative tension to said active element, of a rotatable passive element capable of rotation in one direction by frictional contact with said active element and revolvable in the reverse direction by gravitational action of said damper mechanism connected therewith, non-rotative support for said active element offering frictional resistance to rotation by opposing bodily displacement in one direction and a thermal couple whose expansions and contractions due to changes in temperature produce variations in pressure between said active and passive elements and between said active element and said non-rotative support, substantially as herein set forth.

6. The combination with damper mechanism, an axially displaceable active element which is also rotative for actuating said damper mechanism in one direction against gravitational resistance and a motive weight tending to constantly rotate said active element, of an axially displaceable passive element capable of rotation in one direction by frictional contact with said active element and revolvable in the reverse direction by gravitational action of said damper mechanism when released, non-rotative support for said active element offering frictional resistance to rotation by limiting downward displacement and a thermal couple whose expansions and contractions due to temperature changes raise or depress said passive element axially producing variations in pressure between said active and passive elements and between said active element and its non-rotative support, substantially as herein set forth.

7. The combination with damper mechanism self acting by gravitation in one direction, an active element vertically displaceable against gravitation and rotative horizontally for actuating said damper mechanism in one direction against natural resistance and a motive weight giving constant rotational tension to said active element, of a vertically displaceable passive element also capable of rotation by frictional contact with said active element and revolvable in the reverse direction by gravitational action of said damper mechanism when released, non-rotative support for said active element normally offering frictional resistance to rotation and a thermal couple whose expansions and contractions due to changes in temperature raise or depress said passive element producing variations in pressure between said active and passive elements and between said active element and said non-rotative support, substantially as herein set forth.

8. The combination with damper mechanism, of bodily displaceable passive and active elements, both also capable of rotation, whose peripheral surfaces are disposed to receive variations of frictional contact by relative bodily displacements of said elements, operative connection between said damper mechanism and said passive element, a thermal couple adapted to effect relative bodily displacements of said passive and active elements for varying the intensity of their frictional contacts, non-rotative support against which said active element normally presses but from which the pressure may be relieved by action of said thermal couple and a motor constantly actuating said active element to rotate in one direction against frictional resistance of said support and the natural resistance of said damper mechanism, substantially as herein set forth.

9. The combination with damper mechanism, of a passive element capable of rotation whose bearings also permit of its bodily displacement, a thermal couple adapted by expansion and contraction to displace said passive element bodily, operative rotative connection between said damper mechanism and said passive element, an active rotative element whose periphery is disposed to receive frictional contact with said passive element, axial bearings for said active element which permit of its bodily displacement, a non-rotative support which normally resists rotation and limits bodily displacement of said active element in one direction and a motor adapted to impart constantly rotative tension to said active element, the frictional contact of said active element with said passive element and with said support being subject to variation through the expansive and contractive action of said thermal couple, substantially as herein set forth.

10. The combination with damper mechanism, a passive element capable of rotation whose bearings permit also of its bodily displacement, a thermal couple, rotative actuating connection of said passive element with said damper mechanism and thrust connection whereby expansions and contractions in said thermal couple bodily displace said passive element, of an active rotative element also bodily displaceable disposed to receive increasing frictional contact with said passive element when said thermal couple expands, a motor which constantly imparts rotative effort to said active element and a non-rotative support disposed to limit the bodily displacement of said active element in one direction, offer frictional resistance to its rotative efforts and permit easement of its frictional contact with said passive element when said thermal couple contracts, substantially as herein set forth.

11. The combination with damper mechanism and a passive element capable of rotation for actuating said damper mechanism, of a rotative active element whose peripheral surface is disposed to receive variations of frictional contact with said passive element, a motor constantly impelling rotation of said active element, a non-rotative support disposed to receive variable frictional contact with said active element and a thermal couple whose expansions and contractions produce varying degrees of pressure between said active and passive elements while at the same time affecting oppositely the relative degrees of pressure between the rotative active element and the non-rotative support, substantially as herein set forth.

12. The combination with damper mechanism, an axially displaceable passive element also capable of rotation for actuating said damper mechanism and a thermal couple adapted to displace said passive element bodily, of a rotative active element also bodily displaceable whose peripheral surface is disposed to receive variable frictional contact with said passive element, a non-rotative support to limit the bodily displacement of said active element in one direction, a motor constantly tending to rotate said active element in one direction and operative connection with said damper mechanism including a flexible actuating plate rotatively connected with said passive element for reducing frictional interference with the latter's bodily displacement in an axial direction, substantially as herein set forth.

13. The combination with damper mechanism, of bodily displaceable passive and active elements both also capable of rotation whose peripheral surfaces are disposed to receive variations of frictional contact through relative bodily displacements, operative connection between said passive element and said damper mechanism, a motor constantly impelling rotation of said active element in one direction, a non-rotative support disposed to receive variable degrees of pressure against said active element and a thermal couple whose expansions and contractions vary the degrees of frictional contact between said rotatable elements contrarily to simultaneous variations in degrees of pressure between said active element and said non-rotative support, substantially as herein set forth.

THOMAS O. PERRY.